Oct. 4, 1966   F. LORE   3,276,137
PARKING GUIDE AND METHOD OF PARKING
Filed April 5, 1962
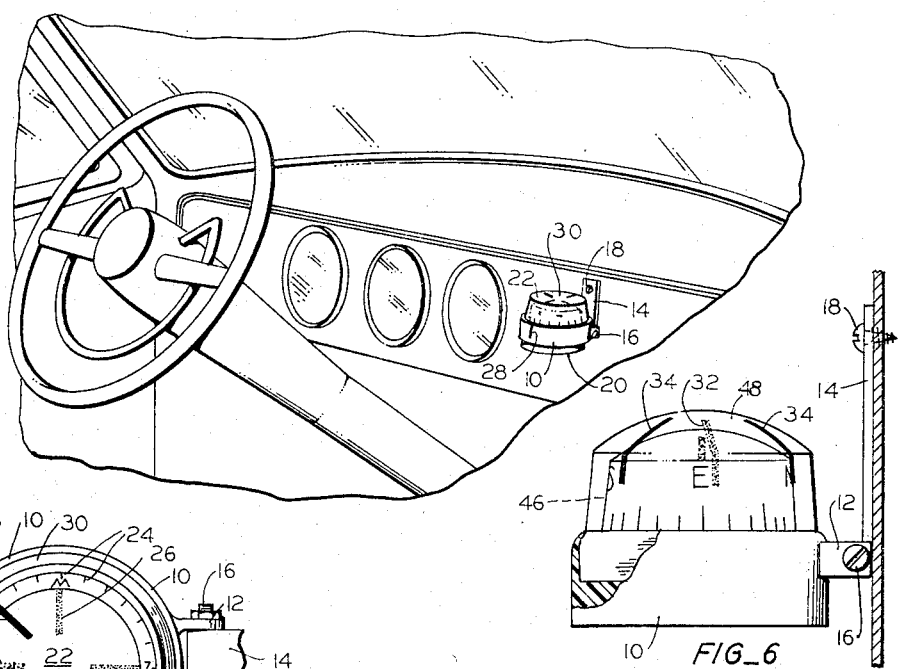
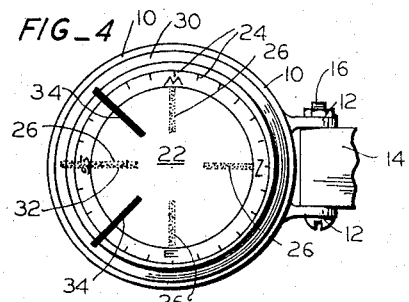
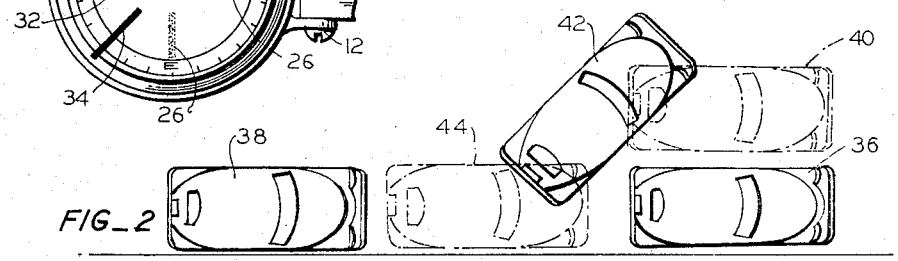
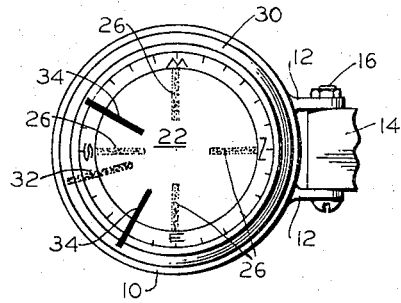
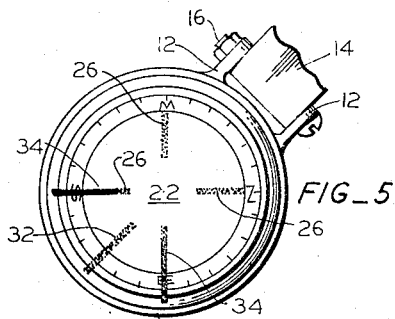
INVENTOR.
FRANK LORE
BY
*Naylor + Neal*
ATTORNEYS United States Patent Office 3,276,137
Patented Oct. 4, 1966

3,276,137
PARKING GUIDE AND METHOD OF PARKING
Frank Lore, 54 Guttenberg St., San Francisco, Calif.
Filed Apr. 5, 1962, Ser. No. 185,301
1 Claim. (Cl. 33—222)

This invention relates to parking guides for vehicles and more particularly to a combined parking guide and magnetic compass and the method of parking a vehicle which employs the same.

In the normal method of parallel parking a conventional automobile having front steerable wheels, the car is first positioned parallel to the space in which it is to be parked, laterally removed from the space by the width of the car and positioned forwardly from the space by the length of the car. These distances are approximate; the lateral spacing is usually slightly greater than the width of the car to permit the car to clear other cars parked in adjacent spaces, and the longitudinal spacing is generally slightly shorter than the length of the car, it being recommended that the rear wheels of the car to be parked be positioned beside the rear end of the vehicle parked in front of the space to be occupied. With the automobile thus positioned, the front wheels are steered away from the space to be occupied while the car is backed into the space until the car is approximately halfway into the space, and thereafter the steering of the front wheels is reversed while backing the car further into the space thus bringing both front and rear wheels into the desired space.

While this method of parallel parking is well-known and widely used, it is one of the most difficult skills for a new driver to learn and one which many drivers never master very well. Apparently, the problem most drivers have in performing this method of parallel parking is the problem of judging when the halfway point in backing into the space occurs when the steering of the front wheels should be reversed. This halfway point occurs when the car is inclined at an angle of about forty-five degrees to its original position, but this angle is difficult for many drivers to judge, even when given some guide to use for the purpose. Thus, a driver may keep in his car some angular reference to use as a guide in judging the angle of the inclination of his car to the curb or to another parked car, but such guides are crude and for most drivers unsatisfactory.

It is an object of this invention to provide a guide for parallel parking and a method of employing the same whereby parallel parking may be simplified.

It is another object of this invention to provide such a parking guide which will aid the driver in ascertaining the halfway point in the method of parallel parking described above.

It is another object of this invention to provide such a parking guide with which a driver can ascertain that his vehicle has reached this halfway point by a simple observation in his vehicle without requiring the driver to estimate the inclination or alignment of his vehicle or any guide therein with his surroundings.

It is another object of this invention to provide such a parking guide which may function as a magnetic compass which may be manufactured as easily as magnetic compasses which are now made for use in vehicles.

It is another object of this invention to provide such a combined parking guide and magnetic compass in which the components and indicia used as a compass may also be used as the parking guide.

Other objects and advantages of the invention will become apparent from the following description read in conjunction with the attached drawings in which:

FIG. 1 is a perspective view of a portion of the driver's compartment of a vehicle with the parking guide of this invention installed therein;

FIG. 2 is a diagram showing a vehicle being parallel parked between two other vehicles with the vehicle being shown at the halfway point in the parking method and with it being shown in phantom outline at the start and completion of the parking method;

FIG. 3 is a plan view of the parking guide as it may appear when the vehicle to be parked is first postioned in the starting position shown in FIG. 2;

FIG. 4 is a plan view of the parking guide showing the position to which it is manually adjusted while the vehicle is in the starting position, this being the same condition in which the parking guide will be seen at the completion of the parking method when the vehicle is parallel parked between the other two vehicles;

FIG. 5 is a plan view of the parking guide showing its condition when the vehicle arrives at the halfway point in the parking method, and FIG. 6 is an enlarged side elevational view of a slightly modified form of the parking guide.

Referring now in detail to the drawings and particularly to FIGS. 1 and 3–5, the parking guide shown therein has a central fixed body portion 10 in the general shape of a ring which carries ears 12 thereon to which a mounting bracket 14 is attached by a screw and nut assembly 16. The bracket 14 may be attached to the dashboard or other suitable elements in the vehicle by means of a screw 18 or the like, the device being mounted in a visible location in the vehicle preferably to the right of the steering wheel where the driver may view it easily while parallel parking his vehicle.

The body portion 10 has a housing 20 mounted thereon as its base, and a floating compass member is supported in the housing 20 preferably floating in a low viscosity liquid to facilitate its free rotation about a vertical axis centrally of the body 10. The compass element 22 carries the usual magnet by which the compass element 22 is maintained oriented with the earth's magnetic field, and the base of the housing 20 may be provided with conventional small compensating magnets by which the orientation of the compass member 22 may be made independent of ferromagnetic parts normally found in the vehicle.

As can be seen clearly in FIGS. 3–5, the compass member 22 carries peripheral indicia 24 denoting the rotational positions of the compass member with the indicia including four heavy indices 26 positioned ninety degrees apart from each other about the axis of the compass member 22 and denoting the four major points of the compass. The heavy indices 26 extend up the side of the compass member 22 and across its top. An index 28 is provided on the main body portion 10 which cooperates with the peripheral indicia 24 to denote the direction of travel of the vehicle.

A transparent dome 30 is mounted on the body 10 for manual rotation about the axis of the compass member 22 and carries thereon a central index 32 and two auxiliary indices 34 on opposite sides of the index 32 and positioned therefrom forty-five degrees around the axis of rotation of the dome 30. The indices 32 and 34 are preferably made of different colored materials and extend upwardly over a portion of the side of the dome and over its top for alignment with the main indices 26 on the magnetic compass member 22.

*Operation*

The device illustrated in FIG. 1 may obviously be employed in customary manner as a magnetic compass denoting the direction of travel of the vehicle on which it is mounted. The magnetic compass member 22 will maintain itself in alignment with the earth's magnetic field as the vehicle moves, and the fixed index 28 on the body 10 will be aligned with one of the peripheral indicia 24 on the magnetic compass member 22 indicating the direction of travel of the vehicle.

Referring to FIGS. 2–5, the combined compass and parking guide may be employed to facilitate parallel parking of the vehicle in the following manner. When it is desired to park the vehicle in a predetermined parking space, here shown to be between two previously parked vehicles 36 and 38, the vehicle is first positioned adjacent to the forward vehicle 36 at approximately the position indicated at 40. When the vehicle is so positioned the indices 32 and 34 on the dome member 30 will have a random orientation with respect to the indices 26 on the magnetic compass member 22, the indices 32 and 34 probably having been turned to a position near the bracket 14 while the unit was in use as a magnetic compass.

With the vehicle located at position 40, the index 32 on the dome member 30 will be moved from its random position as indicated in FIG. 3 to a position where it is aligned with one of the major indices 26 on the magnetic compass member 22 as shown in FIG. 4. This positioning of the index 32 records the starting position of the magnetic compass member 22 when the vehicle is in its position 40.

The driver of the vehicle then proceeds to park his vehicle by steering the front wheels away from the space to be occupied while backing the vehicle into the space to be occupied so that the vehicle approaches the solid position thereof at 42 in FIG. 2 while the magnetic compass member 22 maintains its orientation with the earth's magnetic field and the index 32 moves away from the main index 26 with which it was aligned at position 40. When the vehicle reaches the halfway point in the parallel parking operation, as indicated at position 42 in FIG. 2, the vehicle will be inclined to its original position at an angle of forty-five degrees so that the index 32 will have moved to a position midway between two indices 26, and the indices 34 will have moved to positions in registry with two of the indices 26. When the driver observes registry between the indices 34 and two of the indices 26, he knows that the halfway point in the parallel parking operation has arrived and he reverses the steering of the front wheels to back the vehicle from the position 42 to the position 44 in FIG. 2 where the vehicle occupies its intended space. As the vehicle moves from the position 42 to the position 44, the index 32 moves back into alignment with the index 26 with which it was aligned at position 40 of the vehicle.

A number of variations may be employed in the structure of the magnetic compass and parking guide unit depending upon a number of characteristics which may be desirable either to the manufacturer or to the potential user of the device. Thus, for instance, the unit illustrated in FIGS. 1–5 may be made from an existing magnetic compass unit in a vehicle by adding the rotatable cap 30 or a ring with its indices 32 and 34 to any previous existing magnetic compass unit with which it may be used. Where the device is to be initially manufactured for use as a parking guide in accordance with this invention, it may be made, for instance, as an ordinary floating compass device where the magnetic compass member 46 is suspended in a body of fluid within a fluid-tight transparent dome 48 with the indices 32 and 34 provided on the inner surface of the dome before the unit is assembled as indicated in FIG. 6. The unit might also be constructed with but a single reference index on the manually movable member of the combination while a plurality of indices are provided on the magnetic compass element positioned forty-five degrees apart from each other about its axis of rotation; thus the N, E, S and W indices might be formed on the magnetic compass element 22 with heavy black lines while the intermediate NE, SE, etc., indices might be formed with red lines so that the index 32 on the manually movable element may be aligned with a black line when the vehicle is in position 40 and will move into registry with a red line when the vehicle moves to position 42. However, the use of at least two indices positioned forty-five degrees apart on the manually movable member has been found to be more satisfactory from the standpoint of a readily usable device for the driver, and the provision of three indices forty-five degrees apart on the manually movable member provides even more efficient operation particularly where the device is to be used for parallel parking on both sides of a one way street and where it may be necessary to align the index 32 with an index 26 which is almost out of the driver's direct line of sight.

While several specific embodiments of the apparatus of this invention have been illustrated and described above and while a particular method for parking a vehicle in accordance with this invention has been described above, it is obvious that many changes may be made in the details of the matters described without departing from the spirit and scope of the invention.

I claim:

The method of parallel parking a vehicle where the vehicle has a pair of unsteerable wheels at one end thereof and a pair of steerable wheels at the other end thereof and a magnet movably mounted in a visible location in the vehicle and movable to maintain itself in alignment with the earth's magnetic field which comprises:

(A) positioning said vehicle generally parallel to the space in which it is to be parked laterally removed from said space by approximately the width of said vehicle and longitudinally removed from said space by approximately the length of the vehicle with its nonsteerable wheels closer to said space than its steerable wheels, (B) with said vehicle so positioned, recording the orientation of said magnet with respect to said vehicle, (C) steering said steerable wheels away from said space and propelling said vehicle toward said space to guide said unsteerable wheels into said space until said magnet moves to a predetermined inclination to its recorded orientation to said vehicle, and (D) thereafter steering said steerable wheels toward said space and propelling said vehicle into said space until said magnet substantially returns to said orientation.

References Cited by the Examiner

UNITED STATES PATENTS

| | | | |
|---|---|---|---|
| 2,132,168 | 10/1938 | Klein et al. | 33—223 |
| 2,487,044 | 11/1949 | Cude | 33—222 |
| 2,681,633 | 6/1954 | Basso | 33—46.1 X |

LOUIS R. PRINCE, *Primary Examiner.*

ISAAC LISANN, *Examiner.*

I. M. KRIEGSMAN, D. McGIEHAN,
*Assistant Examiners.*